United States Patent
Shimamura et al.

(10) Patent No.: US 11,651,515 B2
(45) Date of Patent: May 16, 2023

(54) TEMPLATE ORIENTATION ESTIMATION DEVICE, METHOD, AND PROGRAM

(71) Applicant: NIPPON TELEGRAPH AND TELEPHONE CORPORATION, Tokyo (JP)

(72) Inventors: Jun Shimamura, Tokyo (JP); Yukito Watanabe, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 191 days.

(21) Appl. No.: 17/054,752

(22) PCT Filed: May 14, 2019

(86) PCT No.: PCT/JP2019/019187
§ 371 (c)(1),
(2) Date: Nov. 11, 2020

(87) PCT Pub. No.: WO2019/221149
PCT Pub. Date: Nov. 21, 2019

(65) Prior Publication Data
US 2021/0217196 A1    Jul. 15, 2021

(30) Foreign Application Priority Data
May 15, 2018   (JP) ............... JP2018-093705

(51) Int. Cl.
*G06T 7/73*    (2017.01)
*G06T 7/77*    (2017.01)

(52) U.S. Cl.
CPC ............ *G06T 7/74* (2017.01); *G06T 7/77* (2017.01); *G06T 2207/20076* (2013.01); *G06T 2207/20224* (2013.01)

(58) Field of Classification Search
CPC ........... G06T 2207/20224; G06T 2207/20076; G06T 7/344; G06T 7/74; G06T 7/77; G06T 7/251
See application file for complete search history.

(56) References Cited

U.S. PATENT DOCUMENTS

2006/0034545 A1* 2/2006 Mattes .................... G06T 7/215
382/294
2010/0232709 A1* 9/2010 Zhang ...................... G06T 7/73
382/201

(Continued)

FOREIGN PATENT DOCUMENTS

JP    2016-95668 A    5/2016
WO    2010/095460 A1    8/2010

OTHER PUBLICATIONS

Brown et al. (2007) "Automatic Panoramic Image Stitching using Invariant Features," International Journal of Computer Vision 74(1), pp. 59-73.

*Primary Examiner* — Ian L Lemieux

(57) ABSTRACT

It is possible to determine a geometric transformation matrix representing geometric transformation between an input image and a template image with high precision. A geometric transformation matrix/inlier estimation section 32 determines a corresponding point group serving as inliers, and estimates the geometric transformation matrix representing the geometric transformation between the input image and the template image. A scatter degree estimation section 34 estimates scatter degree of the corresponding points based on the corresponding point group serving as inliers. A plane tracking convergence determination threshold calculation section 36 calculates a threshold used in convergence determination when iterative update of the geometric transformation matrix in a plane tracking section 38 is performed based on the estimated scatter degree. The plane tracking (Continued)

section 38 iterates update of the geometric transformation matrix so as to minimize a difference in value to pixels of a geometric transformation image obtained by transforming one of the input image and the templated image using the geometric transformation matrix and corresponding pixels until it is determined that convergence has been completed using the calculated threshold.

20 Claims, 8 Drawing Sheets

(56) References Cited

U.S. PATENT DOCUMENTS

| | | | |
|---|---|---|---|
| 2011/0194731 A1* | 8/2011 | BenHimane | G06V 20/00 |
| | | | 382/103 |
| 2011/0299795 A1 | 12/2011 | Shibata | |
| 2014/0037140 A1* | 2/2014 | Benhimane | G06T 7/337 |
| | | | 382/103 |
| 2015/0049955 A1* | 2/2015 | Stoeffler | G06F 16/5838 |
| | | | 382/220 |
| 2015/0206029 A1* | 7/2015 | Chikano | G06V 10/757 |
| | | | 382/201 |

* cited by examiner

TEMPLATE ORIENTATION ESTIMATION DEVICE, METHOD, AND PROGRAM

CROSS-REFERENCE TO RELATED APPLICATIONS

This application is a U.S. 371 application of International Patent Application No. PCT/JP2019/019187, filed on 14 May 2019, which application claims priority to and the benefit of JP Application No. 2018-093705, filed on 15 May 2018, the disclosures of which are hereby incorporated herein by reference in their entireties.

TECHNICAL FIELD

The present invention relates to a template attitude estimation device, a method, and a program, and particularly relates to a template attitude estimation device, a template attitude estimation method, and a program which estimate, from an input image of a plane present in real space and a predetermined template image, a geometric transformation matrix between the input image and the template, and output the geometric transformation matrix.

BACKGROUND ART

The technique of estimating, from an input image of a plane present in real space and a predetermined template image, a geometric transformation matrix between the input image and the template allows augmented reality in which, for example, the plane is regarded as a marker, and computer graphics (CG) is superimposed and displayed in accordance with the position and attitude of the marker. As the geometric transformation matrix, a 3*3 matrix called a homography and a 2*3 matrix called an affine transformation matrix are often used.

For example, in a method in NPL 1, feature points extracted between the template image and the input image are associated with each other by comparing feature amounts extracted from the vicinities of the feature points, and the geometric transformation matrix between the template image and the input image is estimated with high precision by using an outlier removal method called RANSAC.

CITATION LIST

Non Patent Literature

[NPL 1] Matthew Brown, David G. Lowe, "Automatic Panoramic Image Stitching using Invariant Features", International Journal of Computer Vision, Volume 74, Issue 1, pp 59-73, August 2007.

SUMMARY OF THE INVENTION

Technical Problem

In the conventional method, the estimation of the geometric transformation matrix is implemented by using corresponding points between the template images and in the input image. At this point, when unevenness in the position of the corresponding point used in the estimation of the geometric transformation matrix such as concentration of feature points extracted from the template image in a given portion in the template image is present, a problem arises in that precision in the estimation of the geometric transformation matrix deteriorates due to influence of quantization error or the like.

The present invention is achieved in order to solve the above problem, and an object thereof is to provide a template attitude estimation device, a method, and a program capable of determining a geometric transformation matrix representing geometric transformation between an input image and a template image with high precision.

Means for Solving the Problem

In order to attain the above object, a template attitude estimation device according to the present invention includes: an association section which extracts a corresponding point group including a plurality of corresponding points of feature points which correspond to each other between an input image and a template image; a geometric transformation matrix/inlier estimation section which determines a corresponding point group serving as inliers obtained by removing an erroneous corresponding point from the extracted corresponding point group based on the extracted corresponding point group, and estimates a geometric transformation matrix representing geometric transformation between the input image and the template image; and a plane tracking section which determines an optimum geometric transformation matrix by iterating update of the geometric transformation matrix so as to minimize a difference in value between pixels of a geometric transformation image obtained by transforming one of the input image and the template image using the geometric transformation matrix determined by the geometric transformation matrix/inlier estimation section or the geometric transformation matrix which is previously updated, and pixels of one of the input image and the templated image corresponding to the other.

A template attitude estimation method according to the present invention includes: causing an association section to extract a corresponding point group including a plurality of corresponding points of feature points which correspond to each other between an input image and a template image; causing a geometric transformation matrix/inlier estimation section to determine a corresponding point group serving as inliers obtained by removing erroneous corresponding points from the extracted corresponding point group based on the extracted corresponding point group, and estimate a geometric transformation matrix representing geometric transformation between the input image and the template image; and causing a plane tracking section to determine an optimum geometric transformation matrix by iterating update of the geometric transformation matrix so as to minimize a difference in value between pixels of a geometric transformation image obtained by transforming one of the input image and the template image using the geometric transformation matrix determined by the geometric transformation matrix/inlier estimation section or the geometric transformation matrix which is previously updated, and pixels of one of the input image and the templated image corresponding to the other.

A program according to the present invention is a program for causing a computer to function as individual sections of the template attitude estimation device according to the invention described above.

Effects of the Invention

According to the template attitude estimation device, the template attitude estimation method, and the program of the present invention, it is possible to achieve an effect to determine the geometric transformation matrix representing the geometric transformation between the input image and the template image with high precision by determining the corresponding point group serving as inliers, estimating the geometric transformation matrix representing the geometric transformation between the input image and the template image, and iterating the update of the geometric transformation matrix so as to minimize the difference in value between pixels of the geometric transformation image obtained by transforming one of the input image and the template image using the geometric transformation matrix and corresponding pixels.

DESCRIPTION OF EMBODIMENTS

Hereinbelow, with reference to the drawings, an embodiment of the present invention will be described in detail.

Summary According to Embodiment of Present Invention

First, a summary in the embodiment of the present invention will be described.

After a geometric transformation matrix is estimated by using corresponding points of feature points between a template image and an input image, a plane tracking method which tracks the position and attitude of a plane which moves in space on an image at high speed is applied. By automatically determining a threshold for convergence determination required in plane tracking processing by estimating scatter degree from the positions of the corresponding points of the feature points, even in the case where unevenness in the position of the corresponding point used in the estimation of the geometric transformation matrix is present, it is possible to estimate the geometric transformation matrix between the template image and the input image with high precision.

<Configuration of Template Attitude Estimation Device According to Embodiment of Present Invention>

Figure 1:
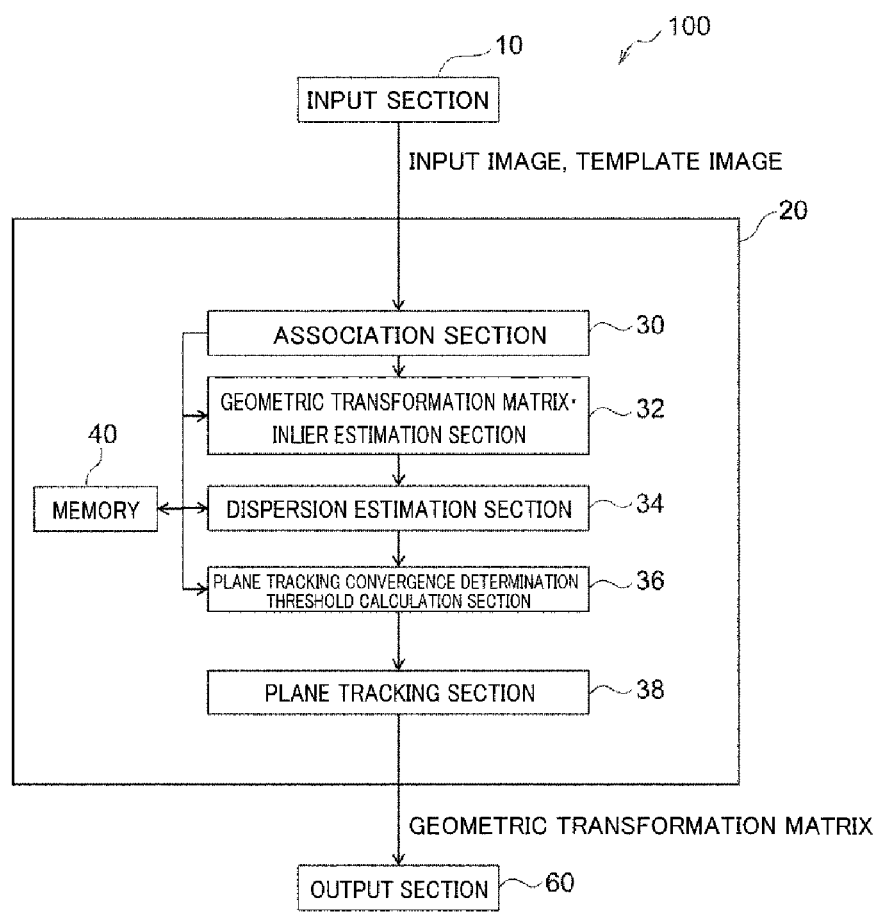
FIG. 1 is a block diagram showing the configuration of a template attitude estimation device according to a first embodiment of the present invention.

Next, a description will be given of the configuration of a template attitude estimation device according to the embodiment of the present invention. As shown in FIG. 1, a template attitude estimation device 100 according to the embodiment of the present invention can be constituted by a computer including a CPU, a RAM, and a ROM which stores a program for executing a template attitude estimation processing routine described later and various pieces of data. In terms of function, the template attitude estimation device 100 includes an input section 10, an operation section 20, and an output section 60, as shown in FIG. 1.

Figure 4:
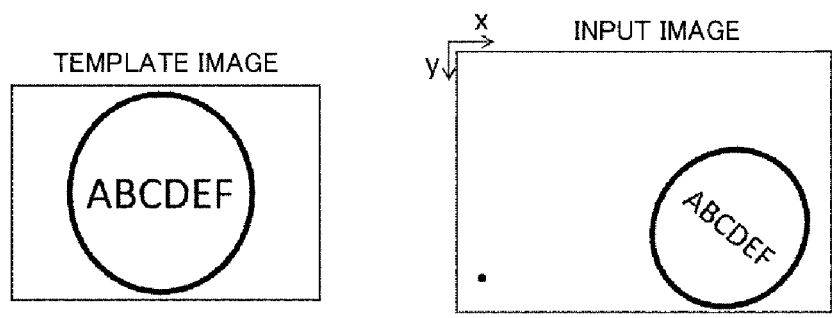
FIG. 4 is a view showing examples of a template image and an input image.

The input section 10 receives input of at least a template image and an input image. For example, the input section 10 receives the template image and the input image having the same plane which is present in real space, as shown in FIG. 4.

The operation section 20 includes an association section 30, a geometric transformation matrix/inlier estimation section 32, a scatter degree estimation section 34, a plane tracking convergence determination threshold calculation section 36, a plane tracking section 38, and a memory 40.

The association section 30 performs association of feature points between the input image and the template image, determines corresponding points of feature points which correspond to each other, extracts a corresponding point group including a plurality of corresponding points, and stores the corresponding point group in the memory 40.

The geometric transformation matrix/inlier estimation section 32 receives the extracted corresponding point group, determines a corresponding point group serving as inliers obtained by removing erroneous corresponding points from the extracted corresponding point group using an outlier removal method, estimates the geometric transformation matrix representing geometric transformation between the input image and the template image from the corresponding point group serving as inliers, and stores the geometric transformation matrix in the memory 40.

The scatter degree estimation section 34 receives the corresponding point group serving as inliers, calculates a degree of dispersion of the positions of the corresponding point group, and stores the degree of dispersion as the scatter degree of the corresponding points in the memory 40. Specifically, the scatter degree estimation section 34 estimates the scatter degree from the minimum value and the maximum value of a coordinate value obtained based on the corresponding point group serving as inliers, an area obtained based on the corresponding point group serving as inliers, the standard deviation of the coordinate value obtained based on the corresponding point group serving as inliers, or the interquartile range of the coordinate value obtained based on the corresponding point group serving as inliers.

The plane tracking convergence determination threshold calculation section 36 receives the scatter degree, and calculates thresholds used in convergence determination when iterative update of the geometric transformation matrix in the plane tracking section 38 is performed from the scatter degree and predetermined thresholds.

The plane tracking section 38 receives the thresholds used in the convergence determination of the plane tracking processing, the input image, the template image, and the geometric transformation matrix determined by the geometric transformation matrix/inlier estimation section 32, uses the geometric transformation matrix as an initial value, determines the optimum geometric transformation matrix by iterating the update of the geometric transformation matrix so as to minimize a difference in value between pixels of a geometric transformation image obtained by transforming one of the input image and the template image using the initial value or the geometric transformation matrix which is updated previously and pixels of one of the input image and the template image corresponding to the other until it is determined that convergence has been completed using the thresholds used in the convergence determination of the plane tracking processing, and outputs the optimum geometric transformation matrix from the output section 60.

<Operation of Template Attitude Estimation Device According to Embodiment of Present Invention>

Figure 2:
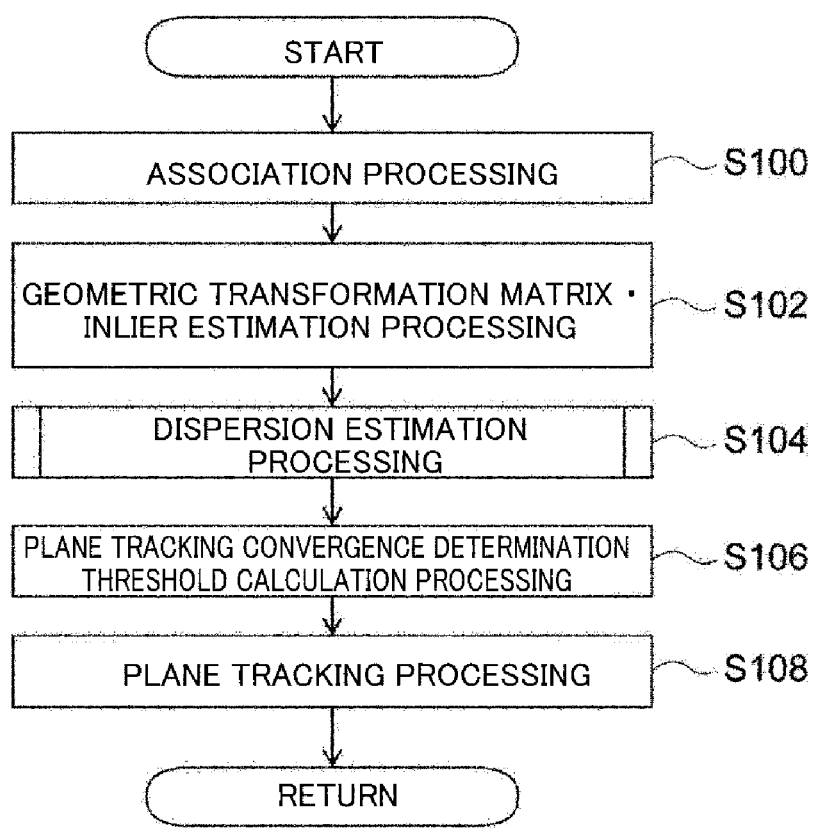
FIG. 2 is a flowchart showing a template attitude estimation processing routine in the template attitude estimation device according to the first embodiment of the present invention.

Next, a description will be given of the operation of the template attitude estimation device 100 according to the embodiment of the present invention. When the input of the input image and the template image is received in the input section 10, the template attitude estimation device 100 executes the template attitude estimation processing routine shown in FIG. 2.

First, in Step S100, association processing by the association section 30 is started. The template image and the input image are input to the association section 30. In the present embodiment, the subsequent description will be made on the assumption that the template image and the input image shown in FIG. 4 have been input. The association section 30 determines corresponding points of feature points which correspond to each other between the images which are the template image and the input image. This corresponding point determination processing can be implemented by, e.g., a conventional method such as NPL 1 or NPL 2, and hence the corresponding point determination processing will be described briefly. In the association section 30, feature points indicative of a corner and an edge on the image are extracted from each of the template image and the input image first. Feature amount description is performed on each feature point by using pixels in the vicinity of the feature point. Next, a feature amount most similar to the feature amount of a given feature point on one of the images is determined from among all feature points on the other image, and the determined feature amount is determined to be the corresponding point. The corresponding point group are determined by performing the processing on all of the feature points.

[NPL 2] David G. Lowe, "Distinctive image features from scale-invariant keypoints", International Journal of Computer Vision, 60, 2 (2004), pp. 91-110.

Lastly, the association section 30 outputs the determined corresponding point group, and ends the processing. In the present embodiment, the subsequent description will be made on the assumption that the corresponding point group shown in FIG. 5 have been determined and outputted.

Figure 5:
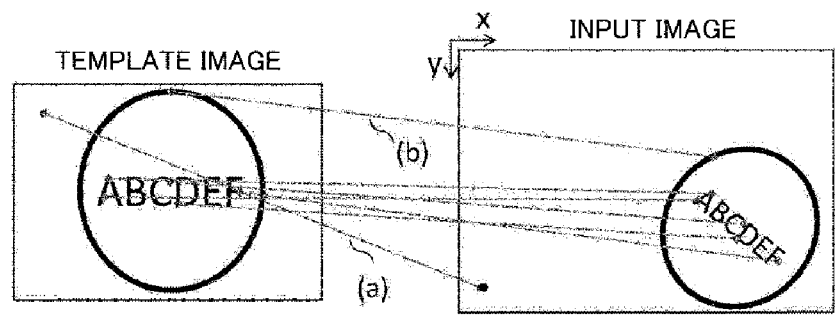
FIG. 5 is a view showing an example of a corresponding point group between the template image and the input image.

Next, in Step S102, geometric transformation matrix/inlier estimation processing by the geometric transformation matrix/inlier estimation section 32 is started. The corresponding point group obtained in Step S100 described above are input, and the geometric transformation matrix and the corresponding point group serving as inliers are estimated using the outlier removal method. This processing can be implemented by using, e.g., robust estimation. That is, by using an affine transformation matrix or a homography transformation matrix as the geometric transformation matrix representing a geometric model and applying the robust estimation such as RANSAC, corresponding points on the same plane are estimated while erroneous corresponding points are removed. By this processing, the geometric transformation matrix is estimated while corresponding points other than those on the plane are removed as erroneous corresponding points. For example, erroneous corresponding points (see (a) in FIG. 5) generated due to presence of a similar pattern in FIG. 5 are removed, and the other corresponding points remain as inliers. Herein, in addition to RANSAC, PROSAC (NPL 3) or MLESAC (NPL 4) may also be used as the method of the robust estimation.

[NPL 3] Chum, O.; and Matas, J.: Matching with PROSAC—Progressive Sample Consensus, CVPR 2005

[NPL 4] P. H. S. Torr and A. Zisserman, "MLESAC: a new robust estimator with application to estimating image geometry," Computer Vision and Image Understanding—Special issue on robusst statistical techniques in image understanding archive, Volume 78, Issue 1, April 2000, Pages 138-156

Figure 6:
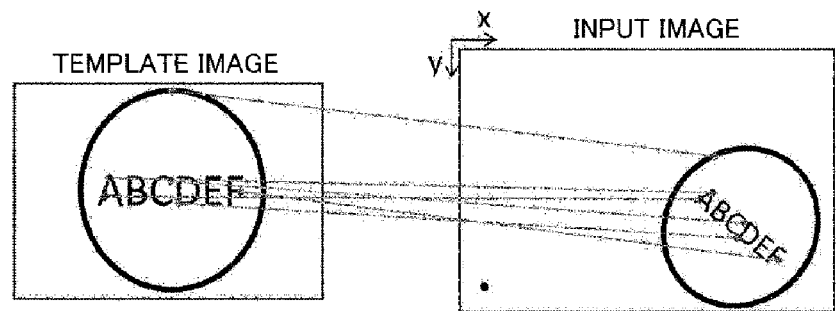
FIG. 6 is a view showing an example of a corresponding point group serving as inliers between the template image and the input image.

Lastly, the geometric transformation matrix/inlier estimation section 32 outputs the determined geometric transformation matrix and the determined corresponding point group serving as inliers, and ends the processing. In the present embodiment, the subsequent description will be made on the assumption that the corresponding point group shown in FIG. 6 have been outputted as inliers.

Figure 3:
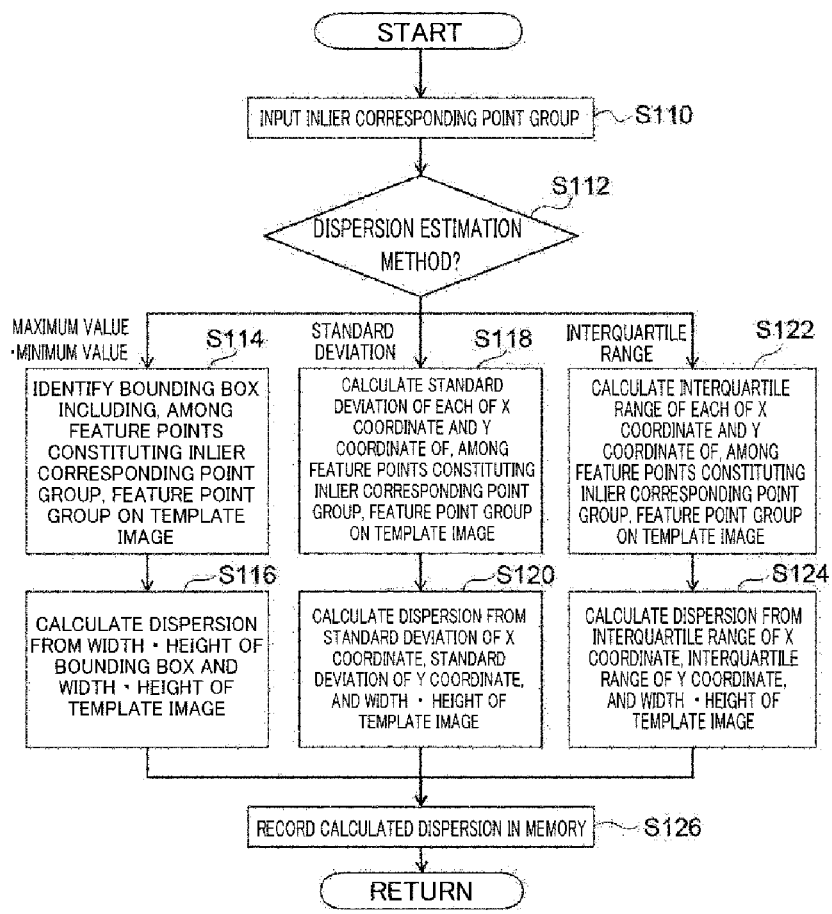
FIG. 3 is a flowchart showing scatter degree estimation processing in the template attitude estimation device according to the first embodiment of the present invention.

Next, in Step S104, scatter degree estimation processing by the scatter degree estimation section 34 is started. The processing performed in the scatter degree estimation section 34 will be described based on the flowchart in FIG. 3. When the scatter degree estimation processing by the scatter degree estimation section 34 is started, in Step S110, the scatter degree estimation section 34 receives the corresponding point group serving as inliers as input. Next, in Step S112, the scatter degree estimation section 34 determines which one of "maximum value minimum value", "standard deviation", and "interquartile range" is used as the scatter degree estimation method.

In the case where the scatter degree estimation method which uses "maximum value/minimum value" is determined to be the scatter degree estimation method, the scatter degree estimation section 34 performs processing in Steps S114 and S116 described below.

Figure 7:
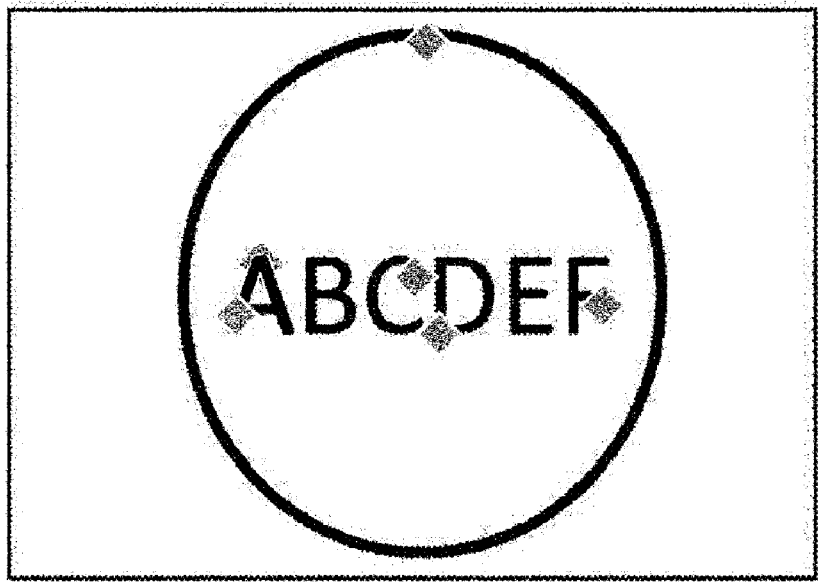
FIG. 7 is a view for explaining a method for estimating scatter degree.
Figure 8:
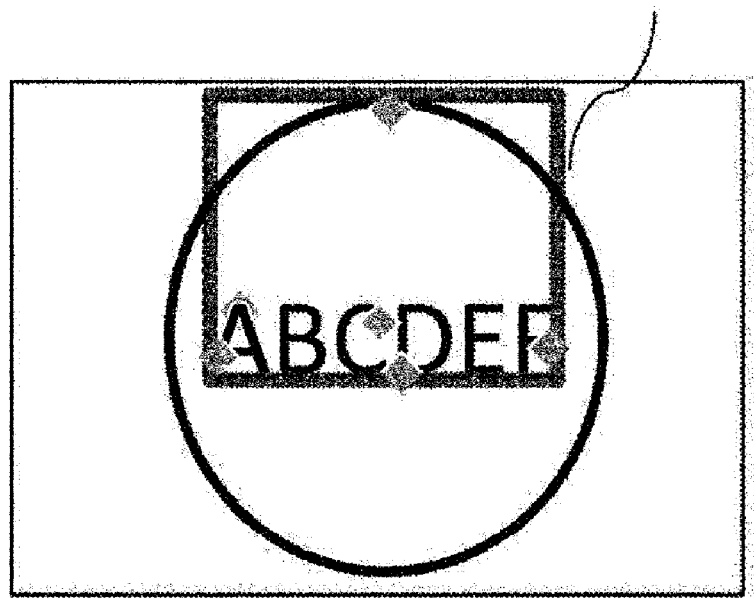
FIG. 8 is a view for explaining the method for estimating the scatter degree.

First, in Step S114, the scatter degree estimation section 34 identifies a bounding box including, among feature points constituting the corresponding point group serving as inliers, a feature point group on the template image. In the present embodiment, among the corresponding point group serving as inliers shown in FIG. 6, feature points on the template image are those shown in FIG. 7. The bounding box including the feature points is a frame shown in FIG. 8. Next, from the width height of the bounding box and the width height of the template image, the scatter degree estimation section 34 calculates the scatter degree which is used in the plane tracking convergence determination threshold calculation section 36 in a subsequent stage.

For example, when (min_x, min_y) denote upper right coordinates of the bounding box, (max_x, max_y) denote lower right coordinates thereof, Tw denotes the width of the template image, Th denotes the height thereof, and a denotes values from 0 to 1, scatter degree W can be calculated by, e.g., the following Formula (1).

$$W=\alpha*(\max\_x-\min\_x)/Tw+(1-\alpha)*(\max\_x-\min\_x)/Th \qquad (1)$$

Herein, the smallest rectangle which surrounds a given two-dimensional point set and in which rotation is considered may be determined instead of the bounding box. In addition, the scatter degree W may be calculated by Formula (2) using an area S_area of the bounding box or the smallest rectangle in which rotation is considered instead of maximum value minimum value.

$$W=S\_area/Tw*Th \qquad (2)$$

In the case where the scatter degree estimation method which uses "standard deviation" is determined to be the scatter degree estimation method, processing in Steps S118 and S120 described below is performed.

In Step S118, the standard deviation of each of an X coordinate and a Y coordinate of, among feature points constituting the corresponding point group serving as inliers, the feature point group on the template image is calculated. Next, in Step S120, from a standard deviation stddev_x of the X coordinate, a standard deviation stddev_y of the Y coordinate, and the width Tw·height Th of the template image, the scatter degree W is calculated by Formula (3).

$$W = \alpha * stddev\_x/Tw + (1-\alpha) * stddev\_y/Th \quad (3)$$

In the case where the scatter degree estimation method which uses "interquartile range" is determined to be the scatter degree estimation method, processing in Steps S122 and S124 described below is performed.

In Step S122, the interquartile range of each of the X coordinate and the Y coordinate of, among the feature points constituting the corresponding point group serving as inliers, the feature point group on the template image is calculated. Next, in Step S124, from an interquartile range IQR_x of the X coordinate, an interquartile range IQR_y of the Y coordinate, and the width Tw·height Th of the template image, the scatter degree W is calculated by Formula (4).

$$W = \alpha * IQR\_x/Tw + (1-\alpha) * IQR\_y/Th \quad (4)$$

Herein, when pieces of data are arranged in the order of magnitude, a value positioned at 25% from the lowest value, a value positioned at 50%, and a value positioned at 75% are referred to as the first quartile, the second quartile, and the third quartile respectively, and a value obtained by subtracting the first quartile from the third quartile is the interquartile range. The interquartile range is characterized in that the interquartile range is not influenced by extreme values relatively. In the present embodiment, for example, even in the case where the corresponding point which is actually an erroneous correspondence indicated by (b) in FIG. 5 is included as an inlier, it becomes possible to correctly calculate the scatter degree without being influenced by the presence thereof by using the interquartile range. The scatter degree has a value which is not influenced by, e.g., the erroneous corresponding point indicated by (b) in FIG. 5.

The scatter degree W calculated in this manner has a larger value as the scatter degree of the positions of the feature points constituting the corresponding point group serving as inliers on the template image becomes larger, and has a small value in the case where unevenness such as concentration of feature points in a given portion is present.

In Step S126, the scatter degree estimation section 34 records the calculated scatter degree in the memory 40, and ends the processing.

Next, in Step S106, plane tracking convergence determination threshold calculation processing by the plane tracking convergence determination threshold calculation section 36 is started. The plane tracking convergence determination threshold calculation section 36 receives the scatter degree, and calculates thresholds used in the convergence determination of the plane tracking processing from the scatter degree and predetermined thresholds. The plane tracking processing is a method for tracking the position and attitude on the input image of the plane in real space at high speed, and allows tracking with a small calculation amount by optimization calculation which directly uses the appearance of the plane without performing feature extraction. The optimization calculation is a method for estimating the optimum geometric transformation matrix by updating the geometric transformation matrix by using iterative processing so as to minimize a difference in value between pixels of a geometric transformation image which is aligned with the input image by transforming, e.g., the template image using the geometric transformation matrix, and corresponding pixels of the input image. As thresholds of the convergence determination of the iterative processing, a maximum iteration count, and a root mean square (RMS) Error value indicative of a difference between the geometric transformation image and the input image are often used. For example, in a method in NPL 5, in the case where a maximum iteration count Iter is exceeded or in the case where ARMS obtained by subtracting the RMS value after geometric transformation matrix update from the RMS value before the geometric transformation matrix update is less than a predetermined required precision threshold ΔRMS_th, it is determined that convergence has been completed. The larger maximum iteration count Iter or the smaller value of ΔRMS_th means that a convergence criterion is strict, and the iteration count is increased. Conversely, the smaller maximum iteration count Iter or the larger value of ΔRMS_th means that the convergence criterion is moderate, and the iteration count is reduced.

[NPL 5] Selim, Benhimane and Ezio Malis, "Real-time image-based tracking of planes using efficient second-order minimization," IEEE/RSJ International Conference on Intelligent Robots and Systems (IROS). 1. pp. 943-948 vol. 1, 2004.

While the setting of the thresholds significantly influences correct estimation of the geometric transformation matrix, the setting depends on experience, and it is extremely difficult for a person with no skill to perform the setting. In order to solve this problem, in the plane tracking convergence determination threshold calculation section 36, the thresholds required for the plane tracking processing are automatically determined by using the scatter degree received from the scatter degree estimation section 34 and the predetermined thresholds.

As described above, the input scatter degree W calculated in the scatter degree estimation section 34 has a larger value as the scatter degree of the positions of the feature points constituting the corresponding point group serving as inliers on the template image becomes larger, and has a small value in the case where unevenness such as concentration of feature points in a given portion is present. That is, when the scatter degree W has a small value, it follows that the geometric transformation matrix is estimated from the corresponding point group which are unevenly positioned in a portion in the template image, and the precision is supposed to be low. In such a case, it is necessary to make the convergence criterion strict. Conversely, when the scatter degree W has a large value, it follows that the geometric transformation matrix is estimated from the corresponding point group extracted from the entire area in the template image, and the precision is supposed to be high. In such a case, it follows that the convergence criterion may be made moderate. The plane tracking convergence determination threshold calculation section 36 automatically determines the maximum iteration count Iter and the required precision threshold ΔRMS_th from the scatter degree W which is input based on the above idea, a maximum iteration count Iter_ini, and a required precision threshold ΔRMS_ini which are the predetermined thresholds. Specifically, the maximum iteration count Iter and the required precision threshold ΔRMS_th to be automatically determined can be calculated by Formula (5) and Formula (6), respectively.

$$Iter = Iter\_ini/W \quad (5)$$

$$\Delta RMS\_th = \Delta RMS\_ini * W * \quad (6)$$

Lastly, the plane tracking convergence determination threshold calculation section 36 outputs the maximum iteration count Iter and the required precision threshold ΔRMS_th which are used in the convergence determination of the plane tracking processing, and ends the processing.

Lastly, in Step S108, the plane tracking processing by the plane tracking section 38 is started. The plane tracking section 38 receives the maximum iteration count Iter and the required precision threshold ΔRMS_th which are the thresholds used in the convergence determination of the plane tracking processing, the template image, the input image, and the geometric transformation matrix calculated in the geometric transformation matrix/inlier estimation section 32, uses the geometric transformation matrix as the initial value, updates the geometric transformation matrix by performing the plane tracking processing until it is determined that the convergence has been completed using the thresholds used in the convergence determination of the plane tracking processing, and outputs the updated geometric transformation matrix. This processing is identical to the method described in NPL 5, and hence the detailed description thereof will be omitted.

As described thus far, according to the template attitude estimation device according to the embodiment of the present invention, by determining the corresponding point group serving as inliers, estimating the geometric transformation matrix representing the geometric transformation between the input image and the template image, and iterating the update of the geometric transformation matrix so as to minimize the difference in value to pixels of the geometric transformation image obtained by transforming one of the input image and the template image using the geometric transformation matrix and corresponding pixels, even in the case where unevenness in the position of the feature point used in the estimation of the geometric transformation matrix is present, it is possible to determine the geometric transformation matrix representing the geometric transformation between the input image and the template image with high precision.

In addition, by calculating the thresholds used in the convergence determination of the plane tracking processing in accordance with the scatter degree of the corresponding points, even in the case where unevenness in the position of the feature point used in the estimation of the geometric transformation matrix is present, it is possible to estimate the geometric transformation matrix between the input image and the template with higher precision from the input image of the plane present in real space and the predetermined template image.

While the present invention has been described thus far specifically based on an example of the embodiment, the above description of the embodiment is for describing the present invention, and the description thereof should not be understood as limiting the invention described in the scope of claims or restricting the scope thereof. In addition, the configuration of each means of the present invention is not limited to the above embodiment, and can of course be variously modified within the technical scope described in the scope of claims.

For example, in the optimization calculation, the geometric transformation matrix may be updated such that a difference between pixel values which correspond to each other between the geometric transformation image aligned with the template image by transforming the input image using the geometric transformation matrix and the template image is minimized.

REFERENCE SIGNS LIST

10 Input section
20 Operation section
30 Association section
32 Geometric transformation matrix/Inlier estimation section
34 Scatter degree estimation section
36 Plane tracking convergence determination threshold calculation section
38 Plane tracking section
40 Memory
60 Output section
100 Template attitude estimation device

The invention claimed is:

1. A computer-implemented method for determining an orientation of a template image relative to an input image, the method comprising:

receiving the input image and the template image;

extracting, based on feature values of the received input image corresponding to the template image, a first set of corresponding points, wherein the first set of corresponding points include one or more non-corresponding points caused by errors;

determining, based on the extracted first set of corresponding points, a second set of corresponding points, wherein the second set of corresponding points represent inliers by removing the one or more non-corresponding points from the first set of corresponding points;

determining a geometric transformation matrix, wherein the geometric transformation matrix represents a geometric transformation between the input image and the template image;

generating, based on a degree of scattering associated with the inliers, a threshold value, wherein the threshold value relates to a convergence determination of a geometric transformation matrix;

iteratively updating the determined geometric transformation matrix using the threshold value until the determined geometric transformation matrix converges, wherein the iterative update includes minimizing a difference in values of:

pixels of either one of the input or the template image, and pixels of a geometric transformation image obtained by transforming the other using one of the determined geometric transformation matrix or the previously updated geometric transformation matrix; and providing the iteratively updated geometric transformation matrix as the orientation of the template image relative to the input image.

2. The computer-implemented method of claim 1, the method further comprising:

determining a degree of scattering of the second set of corresponding points as inliers;

generating, based on the determined degree of scattering, a threshold value for determining a convergence of the iterative update of the determined geometric transformation matrix.

3. The computer-implemented method of claim 2, wherein the degree of scattering is based on at least one of:
- a minimum value and a maximum value of a coordinate value obtained based on the second set of corresponding points as inliers,
- an area obtained based on the second set of corresponding points as inliers,
- a standard deviation of the coordinate value obtained based on the second set of corresponding points as inliers, or
- an interquartile range of the coordinate value obtained based on the second set of corresponding points as inliers.

4. The computer-implemented method of claim 2, wherein the threshold value is a maximum iteration count of the iterative updating.

5. The computer-implemented method of claim 2, wherein the threshold value relates to the difference between values of pixels.

6. The computer-implemented method of claim 2, wherein the generated threshold value for determining a convergence of the iterative update of the determined geometric transformation matrix based on a maximum number of iterations relates to a degree of unevenness in a distribution of the second set of corresponding points as inliers.

7. The computer-implemented method of claim 2, wherein the generated threshold value for determining a convergence of the iterative update of the determined geometric transformation matrix based on the difference between values of pixels relates to a degree of unevenness in a distribution of the second set of corresponding points as inliers.

8. A system for determining an orientation of a template image relative to an input image, the system comprises:
- a processor; and
- a memory storing computer-executable instructions that when executed by the processor cause the system to:
  - receive the input image and the template image;
  - extract, based on feature values of the received input image corresponding to the template image, a first set of corresponding points, wherein the first set of corresponding points include one or more non-corresponding points caused by errors;
  - determine, based on the extracted first set of corresponding points, a second set of corresponding points, wherein the second set of corresponding points represent inliers by removing the one or more non-corresponding points from the first set of corresponding points;
  - determine a geometric transformation matrix, wherein the geometric transformation matrix represents a geometric transformation between the input image and the template image;
  - generating, based on a degree of scattering associated with the inliers, a threshold value, wherein the threshold value relates to a convergence determination of a geometric transformation matrix;
  - iteratively update the determined geometric transformation matrix using the threshold value until the determined geometric transformation matrix converges, wherein the iterative update includes minimizing a difference in values of:
    - pixels of either one of the input or the template image, and
    - pixels of a geometric transformation image obtained by transforming the other using one of the determined geometric transformation matrix or the previously updated geometric transformation matrix; and
  - provide the iteratively updated geometric transformation matrix as the orientation of the template image relative to the input image.

9. The system of claim 8, the computer-executable instructions when executed further causing the system to:
- determine a degree of scattering of the second set of corresponding points as inliers;
- generate, based on the determined degree of scattering, a threshold value for determining a convergence of the iterative update of the determined geometric transformation matrix.

10. The system of claim 9, wherein the degree of scattering is based on at least one of:
- a minimum value and a maximum value of a coordinate value obtained based on the second set of corresponding points as inliers,
- an area obtained based on the second set of corresponding points as inliers,
- a standard deviation of the coordinate value obtained based on the second set of corresponding points as inliers, or
- an interquartile range of the coordinate value obtained based on the second set of corresponding points as inliers.

11. The system of claim 9, wherein the threshold value is a maximum iteration count of the iterative updating.

12. The system of claim 9, wherein the threshold value relates to the difference between values of pixels.

13. The system of claim 9, wherein the generated threshold value for determining a convergence of the iterative update of the determined geometric transformation matrix based on a maximum number of iterations relates to a degree of unevenness in a distribution of the second set of corresponding points as inliers.

14. The system of claim 9, wherein the generated threshold value for determining a convergence of the iterative update of the determined geometric transformation matrix based on the difference between values of pixels relates to a degree of unevenness in a distribution of the second set of corresponding points as inliers.

15. A computer-readable non-transitory recording medium storing computer-executable instructions that when executed by a processor cause a computer system to:
- receive the input image and the template image;
- extract, based on feature values of the received input image corresponding to the template image, a first set of corresponding points, wherein the first set of corresponding points include one or more non-corresponding points caused by errors;
- determine, based on the extracted first set of corresponding points, a second set of corresponding points, wherein the second set of corresponding points represent inliers by removing the one or more non-corresponding points from the first set of corresponding points;
- determine a geometric transformation matrix, wherein the geometric transformation matrix represents a geometric transformation between the input image and the template image;
- generating, based on a degree of scattering associated with the inliers, a threshold value, wherein the threshold value relates to a convergence determination of a geometric transformation matrix;

iteratively update the determined geometric transformation matrix using the threshold value until the determined geometric transformation matrix converges, wherein the iterative update includes minimizing a difference in values of:
pixels of either one of the input or the template image, and
pixels of a geometric transformation image obtained by transforming the other using one of the determined geometric transformation matrix or the previously updated geometric transformation matrix; and
provide the iteratively updated geometric transformation matrix as the orientation of the template image relative to the input image.

16. The computer-readable non-transitory recording medium of claim 15, the computer-executable instructions when executed further causing the system to:
determine a degree of scattering of the second set of corresponding points as inliers;
generate, based on the determined degree of scattering, a threshold value for determining a convergence of the iterative update of the determined geometric transformation matrix.

17. The computer-readable non-transitory recording medium of claim 16, wherein the degree of scattering is based on at least one of:
a minimum value and a maximum value of a coordinate value obtained based on the second set of corresponding points as inliers,
an area obtained based on the second set of corresponding points as inliers,
a standard deviation of the coordinate value obtained based on the second set of corresponding points as inliers, or
an interquartile range of the coordinate value obtained based on the second set of corresponding points as inliers.

18. The computer-readable non-transitory recording medium of claim 16, wherein the threshold value is a maximum iteration count of the iterative updating.

19. The computer-readable non-transitory recording medium of claim 16, wherein the generated threshold value for determining a convergence of the iterative update of the determined geometric transformation matrix based on a maximum number of iterations relates to a degree of unevenness in a distribution of the second set of corresponding points as inliers.

20. The computer-readable non-transitory recording medium of claim 16, wherein the generated threshold value for determining a convergence of the iterative update of the determined geometric transformation matrix based on the difference between values of pixels relates to a degree of unevenness in a distribution of the second set of corresponding points as inliers.

* * * * *